(12) United States Patent
Hendry et al.

(10) Patent No.: US 6,382,019 B1
(45) Date of Patent: May 7, 2002

(54) PROBE AND GAUGE SYSTEM FOR TIRE REPAIR

(75) Inventors: Robert A. Hendry, North Canton; Charles L. Muhs, Newcomerstown, both of OH (US)

(73) Assignee: 31, Incorporated, Newcomerstown, OH (US)

( * ) Notice: Subject to any disclaimer, the term of this patent is extended or adjusted under 35 U.S.C. 154(b) by 0 days.

(21) Appl. No.: 09/211,746

(22) Filed: Dec. 15, 1998

(51) Int. Cl.[7] .......................... E01C 23/00; B29C 73/00
(52) U.S. Cl. ........................................ 73/146; 156/95
(58) Field of Search ............................. 73/146, 146.2, 73/146.3, 146.8, 9, 866.5; 152/154.2, 367, 370; 156/97, 95; 33/534, 600, 471, 174, 512, 414; 116/208, 212, 284, 303

(56) References Cited

U.S. PATENT DOCUMENTS

| | | | | |
|---|---|---|---|---|
| 4,219,936 A | * | 9/1980 | Bridges | 33/174 |
| 4,284,450 A | * | 8/1981 | Duttlinger | 156/97 |
| 4,486,954 A | * | 12/1984 | Mock | 33/174 |
| 4,579,161 A | * | 4/1986 | Roberts | 152/370 |
| 4,625,427 A | * | 12/1986 | Rine | 33/534 |
| 4,731,933 A | * | 3/1988 | Cope | 33/414 |
| 4,995,169 A | * | 2/1991 | Lunden | 33/534 |
| 5,113,590 A | * | 5/1992 | Shapiro et al. | 33/471 |
| 5,588,218 A | * | 12/1996 | Barry et al. | 33/471 |
| 5,678,317 A | * | 10/1997 | Stefanakos | 33/512 |
| 6,089,083 A | * | 7/2000 | Curtis | 73/146 |

* cited by examiner

Primary Examiner—Benjamin R. Fuller
Assistant Examiner—Abdullahi Aw-Musse
(74) Attorney, Agent, or Firm—Sand & Sebolt

(57) ABSTRACT

A probe and gauge system for determining the need for a simple one piece patch-plug, or a complex two piece repair. The probe is inserted into an injury in a tire such as a puncture hole and the angle of the hole, known as the injury angle, is calculated on the gauge to determine the need for a simple one piece patch-plug, or a complex two piece repair.

13 Claims, 3 Drawing Sheets

PROBE AND GAUGE SYSTEM FOR TIRE REPAIR

BACKGROUND OF THE INVENTION

1. Technical Field

The invention relates to repair of punctured or otherwise leaking pneumatic or other tires. More particularly, the invention relates to a system for determining whether a one piece patch-plug, or a two piece complex repair is necessary to repair a hole in a pneumatic or other type of tire. Specifically, the invention is a probe and gauge system whereby the probe is inserted into the hole and the angle of the hole, known as the injury angle, is calculated on the gauge to determine the need for a simple one piece patch-plug, or a complex two piece repair kit.

2. Background Information

Wheels have been used for thousands of years on carts and other horse and oxen drawn carriages, trailers, etc. However, all of these earlier wheels were approximately round stones, pieces of wood, or other similar materials. The ride was very rough as the wheel was not resilient in any manner.

With the advent of the automobile approximately one hundred years ago came the increased demand for wheels in general, and more importantly wheels of a resilient nature. The rubber tire was invented in this same era as the invention of the automobile. These early tires were solid rubber toroidal or donut shaped members. The rubber provided improved characteristics including minimal defamation when a bump was encountered and thus an improved ride.

With increasing automobile speeds and further demand for a better ride, the pneumatic tire was invented. Many patents exist on this revolutionary technology. It rapidly became the industry standard for automobiles as well as trucks, trailers, and almost all other vehicles including air plane tires.

One disadvantage of the pneumatic tire is deflation when punctured or otherwise severed. Any hole deflates the pressurized pneumatic tire and causes collapse of the tire. Such collapse requires the vehicle to immediately stop or else the tire will begin to disintegrate and shread, and damage will also be incurred to the rim the tire is mounted on.

For this reason, the tire must either be replaced or repaired. Patches and plugs have been developed and have been in use for decades to repair the injuries such as puncture holes in both the tube within a tire as well as the actual tire in either a tube or tubeless embodiment. It is this tubeless embodiment that has become the industry standard in many areas such as automobile tires.

Different varieties of repair devices and kits have been developed including patches of a generally flat nature which are adhered and/or melted onto the inside surface of the tire over the hole. Other repair devices include plugs which are inserted into the hole, typically from the outside of the tire. Some of these devices are simple one piece, one step designs while others are more complex involving multiple pieces and/or multiple steps.

One of these repair devices that is popular in the market today is the STEELMAN® PATCH-PLUG COMBO as sold JS Products, Inc. of Las Vegas, Nev. It is a one-piece patch plug combination device that is simple to use to repair injuries such as puncture type holes in pneumatic tires. However, this one-piece patch plug combination device, as well as many other of the devices currently on the market, may only be used in certain type injuries within a known injury angle range or other constraints; otherwise, more complex two piece patch and plug mechanisms are necessary.

It is contemplated that a device or system is needed to indicate to the repairman whether or not the one piece patch plug combination is safely and reliably usable on the given injury.

SUMMARY OF THE INVENTION

Objectives of the invention include providing a device or system for measuring the angle of the injury.

An additional objective of the present invention is to provide a method of determining the angle of the injury to a tire.

A further objective of the present invention is to provide a gauge or other indicia to indicate to a tire repairman whether or not a particular type of repair kit may be used to repair a specific tire injury.

It is yet a further objective of the present invention to provide a tire repair "go"/"no-go" gauge.

These and other objectives and advantages of the invention are obtained by the device, system and method for measuring the angle of injury in a tire of the present invention, the general nature of which may be stated as including a device for determining the availability of a repair kit for an injury extending into a pneumatic tire, the device including an elongated body having a length sufficient to be insertable within the injury while still extending outward from the tire, and a gauge having an edge with a mid-point, the mid-point being alignable with the elongated body at a point of insertion of the elongated body into the injury, the gauge further including at least one indicia thereon indicating a range in which the repair kit is usable. The invention is further embodied as a method of determining the availability of a repair kit for an injury extending into a pneumatic tire, the method including the steps of (1) inserting an elongated body into an injury on a pneumatic tire such that at least a portion of the elongated body remains extending out from the tire, (2) aligning a mid-point on an edge of a gauge with a point of intersection of the elongated body with the tire, and (3) determining the angle of the elongated body in the injury with respect to a perpendicular imaginary line extending from a surface of the tire that the injury extends through.

BRIEF DESCRIPTION OF THE DRAWINGS

Preferred embodiment of the invention, illustrative of the best mode in which applicant has contemplated applying the principles, are set forth in the following description and are shown in the drawings and are particularly and distinctly pointed out and set forth in the appended claims.

Figure 2:
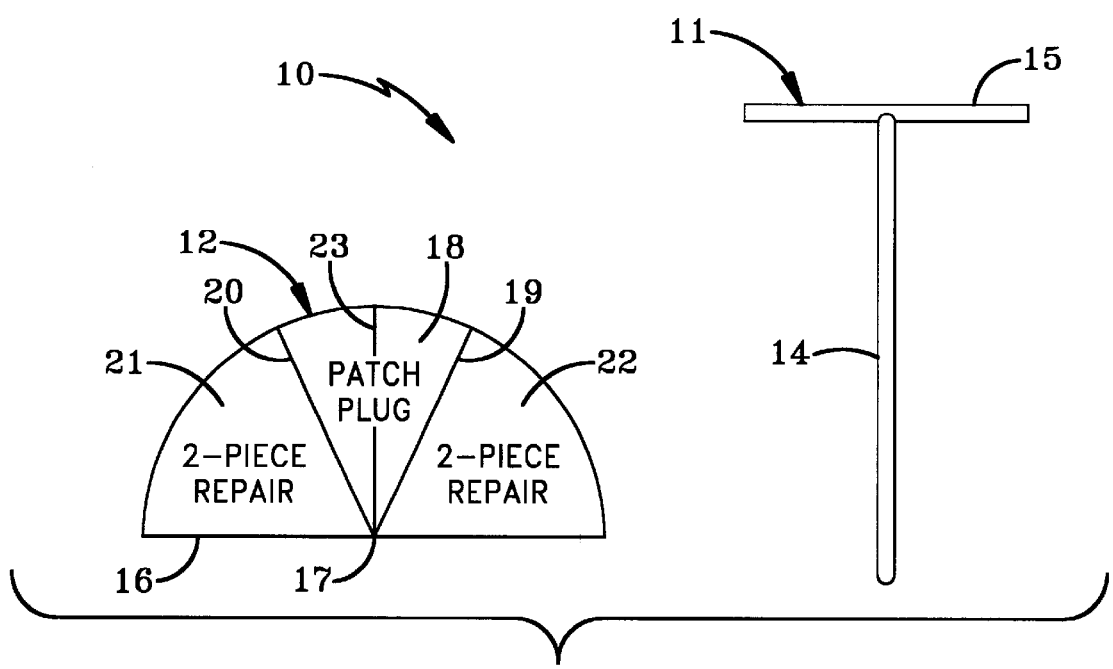
FIG. 2 is an exploded view of the probe and gauge of the invention.

2 and the gauge of the present invention is centered on the probe and resting on the tire as in FIG. 2 to measure the angle of injury whereby such angle is outside of the one piece patch-plug range.

Similar numerals refer to similar parts throughout the drawings.

DESCRIPTION OF THE PREFERRED EMBODIMENT

The invention is a device and system for determining whether a simple and easier to install one piece patch-plug is sufficient, or a two piece complex repair is necessary to repair an injury such as a hole in a pneumatic tire or similar structure. Specifically, the invention is a probe and gauge system 10 including a probe 11 and a gauge 12.

Probe 11 includes an elongated rod 14 or the equivalent. In the displayed embodiment, the elongated rod 14 is of a cylindrical or other smoothed wall nature so as to not snag, rip, or otherwise catch during insertion into a tire 30 as described below. In the displayed embodiment, the probe 11 also includes a handle 15 or other structure to assist in insertion of the rod into the tire while also restricting the rod from insertion too far into the tire 30.

In accordance with one of the features of the invention, gauge 12 includes a flat edge 16 with a middle point or area 17. Gauge 12 further includes, extending outward from the middle point 17, a first indicia range 18 defined by a pair of limit lines 19 and 20, and second and third indicia ranges 21 and 22 outside of the first indicia range 18 on each side thereof, respectively.

In the preferred embodiment, a mid-line 23 extends outward from the middle point 17 in a perpendicular manner to the flat side 16. In this preferred embodiment, each of the limit lines 19 and 20 also extend outward from the middle point 17 where one limit line 19 is preferably 25° from the mid-line 23 while the other limit line 20 is also preferably 25° from the mid-line 23 but on the other side thereof thereby defining a 50° range. In effect a 25° zone on each side of perpendicular is provided. It is contemplated that these limit lines 19 and 20 could be at angles different from 25° and including angles between 1° and 89°.

In accordance with another of the features of the present invention, the first indicia range 18 indicates that the STEELMAN® PATCH-PLUG COMBO or a similar simple to install, one-piece patch-plug device may be used. The second and third indicia ranges indicate that two-piece repairs are more time consuming to install, include more parts and labor, etc. must be used.

In use, a tire to be patched such as tire 30 is removed from the rim that it is mounted on and preferably placed on a tire spreader or similar device in a relaxed condition. In one embodiment, the tire is positioned as such on the tire spreader with the injury 31 in a four or eight o'clock position.

The probe 11, which may be a cement dipped probe as is generally used in tire repair or any other relatively straight and smooth tool such as a screwdriver, is inserted into an injury 31 in a tread or road engaging portion 32 of a pneumatic tire 30, although it is contemplated that it also could be performed in an injury in the side wall 33. The probe 11 is inserted from the outside of the tire into the tire until at least a portion of the probe extends through the innerliner 39 of the tire. Preferably, the probe extends approximately ¼" to ½" beyond the innerliner 39.

Figure 1:
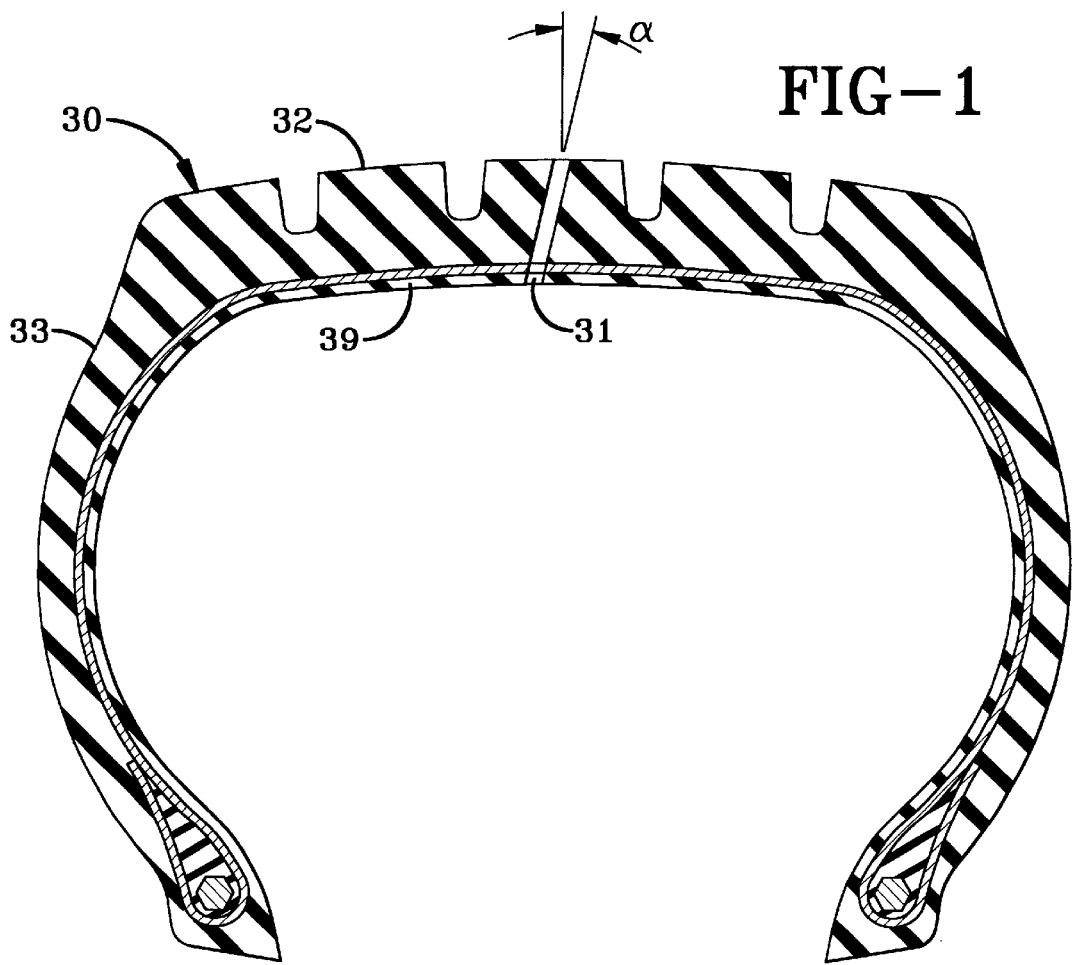
FIG. 1 is a cross sectional view of a portion of a tire with an injury therein.
Figure 3:
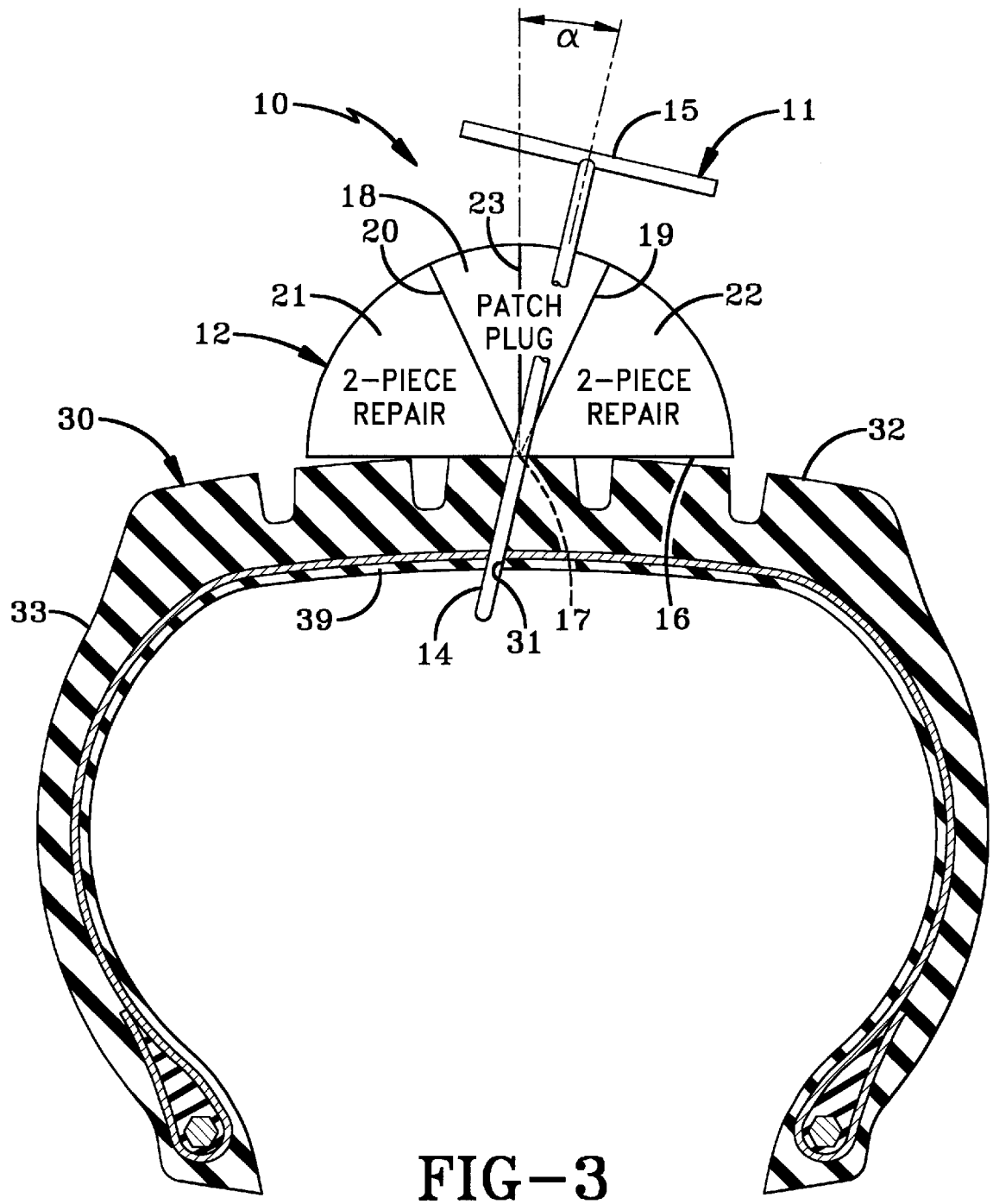
FIG. 3 is the same cross sectional view of the tire as shown in FIG. 1 with the probe of the present invention inserted into the injury and the gauge of the present invention centered on the probe and resting on the tire to measure the angle of injury whereby such angle is within the one piece patch-plug range.

With the probe 11 extending through the injury 31, the middle point 17 of the gauge 12 is aligned with the probe 11 so as to be centered thereon. The gauge 12 is also approximately tangentially resting on the tread 32 at the point of entry of the probe 11 into the injury 31. The gauge 12 is positioned so as to extend across the tread 32 in a manner perpendicular to the overall annular shape of the tire; in effect if a cross section of the tire were taken as shown in FIGS. 1–3, the gauge would be aligned with the cross section or in a radial plane therewith.

Figure 4:
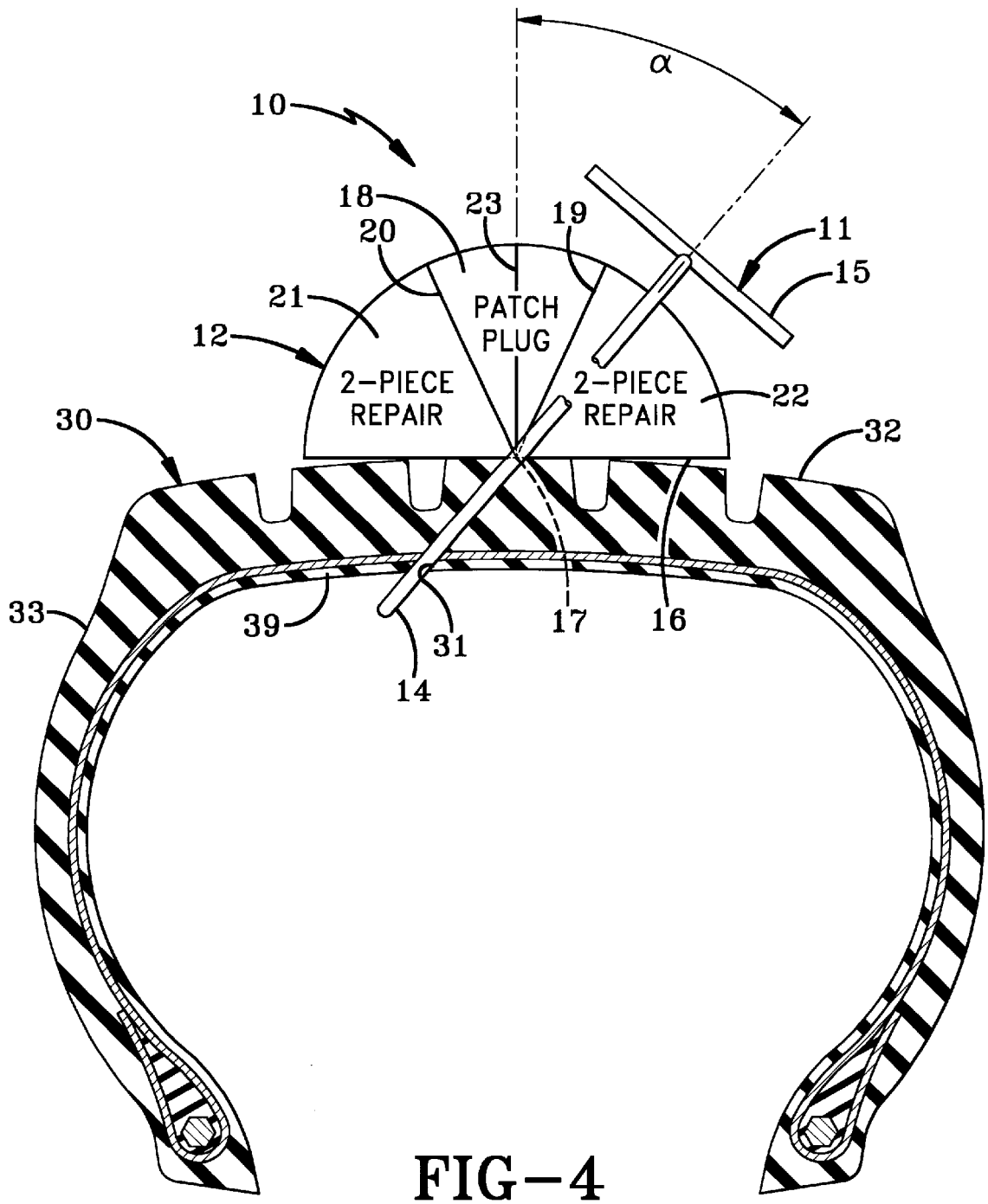
FIG. 4 is the same cross sectional view as in FIG. 1 except the injury is at a different more severe angle, and the probe of the present invention is inserted into the injury as in FIG.

When the probe 11 was inserted into the injury 31, the probe 11 was allowed to follow the direction and contour of the injury. In effect, the rigid probe 11 displays the angle of the injury. This angle is referred to as the injury angle and is shown in FIGS. 1 and 3–4 as angle $\alpha$, which is measured from a perpendicular line to the tread 32.

The gauge 12, when properly positioned as described above, then serves as a backdrop to the portion of the probe 11 extending out from the injury 31. The location of the probe 11 on the gauge 12 acting as backdrop, and specifically the location of the probe 11 in front of one of the first, second and third indicia ranges 18, 21 and 22, respectively, indicates whether or not the STEELMAN® PATCH-PLUG COMBO or a similar simple to install, one-piece patch-plug device, or a more complex and time consuming two-piece repairs must be used. In short, if the probe 11 extends across the first indicia range 18 then the STEELMAN® PATCH-PLUG COMBO or a similar simple to install, one-piece patch-plug device may be used, while if the probe 11 extends across the second or third indicia ranges 21 and 22, then a more complex and time consuming two-piece repair kit must be used.

The location of the limit lines 19 and 20 may be adjusted to angles other than 25° as is necessary based upon the constraints of the patch and/or plug systems used.

In accordance with another feature of the invention, the gauge 12 may be made of any material so long as it includes the flat edge 16, the middle point 17 and the necessary indicia 18, 21 and 22 thereon. In one embodiment, the gauge 12 is cardboard or a similar material and is printed on the side of the box the STEELMAN® PATCH-PLUG COMBO or a similar patch-plug device is shipped in. The gauge 12 is preferably perforated so as to be easily separable from the box, although the gauge could alternatively be cut out.

Accordingly, the improved device, system and method achieves all the enumerated objectives, provides for eliminating difficulties encountered with prior devices, systems, and methods, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved device, system and method is constructed and used, the characteristics of the construction, and the advantageous, new and useful results obtained; the new and useful structures, devices, elements, arrangements, parts and combinations, are set forth in the appended claims.

We claim:

1. A device used to determine whether a one piece patch-plug repair or a two piece complex repair should be used for repairing an injury in a pneumatic tire; the device comprising:

an elongated body adapted to be inserted within the injury while a portion of the elongated body extends outward from the tire; an insertion point being defined at the point where the elongated body enters the injury; and a gauge having an edge with a mid-point, the edge being adapted to engage the pneumatic tire adjacent the insertion point; the mid-point of the gauge being aligned at the insertion point of the enlogated body the gauge including indicia representing the one piece patch-plug type repair and indicia representing the two piece complex repair; the elongated body adapted to overlie these indicia to provide an indication to the user of which type of repair is needed to repair the injury in the pneumatic tire.

2. The device of claim 1 wherein the edge is flat with the mid-point thereon, the indicia including at least one limit line extending from the mid-point.

3. The device of claim 1 wherein the edge is flat with the mid-point thereon, the indicia including at least two limit lines extending from the mid-point and defining a first range therebetween.

4. The device of claim 3 wherein a second and third range are defined outside of the first range.

5. The device of claim 3 wherein the limit lines are opposite one another with respect to an imaginary line extending from the mid-point and being perpendicular to the edge.

6. The device of claim 5 wherein the limit lines are each approximately 25° from the imaginary line.

7. A device used to determine whether a one piece patch-plug repair or a two piece complex repair should be used for repairing an injury in a pneumatic tire; the device comprising:

an elongated body adapted to be inserted within the injury while a portion of the elongated body extends outward from the tire; an insertion point being defined at the point where the elongated body enters the injury; and a gauge having a flat edge with a mid-point, the flat edge being adapted to tangentially engage the pneumatic tire with the mid-point of the gauge positioned at the insertion point; the gauge further including at least one indicia that cooperates with the elongated body to indicate an angle of the injury to allow the user of the device to select either the one piece patch-plug repair or the two piece complex repair for repairing an injury.

8. The device of claim 7 wherein the indicia includes at least two limit lines extending from the mid-point and defining a first range therebetween and a second and third range being defined outside of the first range.

9. The device of claim 8 wherein the limit lines are opposite one another with respect to an imaginary line extending from the mid-point and being perpendicular to the edge.

10. A device used to determine whether a one piece patch-plug repair or a two piece complex repair should be used for repairing an injury in a pneumatic tire; the device comprising:

an elongated body adapted to be inserted within the injury while a portion of the elongated body extends outward from the injury;

a gauge having an edge with a mid-point, the mid-point of the gauge being aligned at a point of insertion of the elongated body into the injury, the gauge including at least one indicia thereon indicative of an angle of the injury;

the edge being flat and disposed tangential to the pneumatic tire;

the gauge including at least two limit lines extending from the mid-point and defining a first range therebetween and a second and third range being defined outside the first range;

the limit lines being opposite one another with respect to an imaginary line extending from the mid-point and being perpendicular to the edge;

the limit lines being each approximately 25° from the imaginary line;

the elongated body overlying one of the ranges; and the first range indicating that a one piece patch-plug repair may be used to repair the injury and the second and third ranges indicating that a two piece complex repair should be used to repair the injury.

11. A method for determining whether a one piece patch-plug repair or a two piece complex repair should be used for repairing an injury in a pneumatic tire; the method comprising the steps of:

inserting an elongated body into an injury in a pneumatic tire such that at least a portion of the elongated body remains extending out from the tire;

aligning a gauge with a point of intersection of the elongated body with the tire; the gauge including indicia representing the one piece patch-plug repair and indicia representing the two piece complex repair; and determining which indicia the elongated body overlies in order to identify the type of repair that must be used to repair the tire injury.

12. The method of claim 11 wherein the indicia includes at least two limit lines extending from the mid-point and defining a first range therebetween and a second and third range are defined outside of the first range; the first range corresponding to the use of the one piece patch-plug repair with the second and third ranges corresponding to the use of the two piece complex repair.

13. The method of claim 12 wherein the gauge includes a flat surface with the mid-point being disposed on the flat surface; the limit lines are each approximately 25° from an imaginary line extending perpendicular to the flat surface.

* * * * *